United States Patent [19]
Greenfield et al.

[11] 3,898,134
[45] Aug. 5, 1975

[54] PROCESS AND APPARATUS FOR RECOVERING CLEAN WATER AND SOLIDS FROM DILUTE, AQUEOUS, SOLIDS CONTAINING SOLUTIONS OR DISPERSIONS

[75] Inventors: Charles Greenfield, Murray Hill; Robert E. Casparian, Boonton; Anthony J. Bonanno, Parsippany, all of N.J.

[73] Assignee: Hanover Research Corporation, East Hanover, N.J.

[22] Filed: Oct. 15, 1973

[21] Appl. No.: 406,632

Related U.S. Application Data

[63] Continuation-in-part of Ser. No. 165,070, July 22, 1971.

[52] U.S. Cl. .................. 203/6; 202/174; 159/1 RW; 159/13 A; 159/20 R; 159/49; 159/DIG. 17 B; 203/47
[51] Int. Cl.² ... B01D 3/34; B01D 3/02; B01D 1/22; B01D 1/26
[58] Field of Search ....... 159/1 RW, DIG. 17, 13 A, 159/47 R, 49, 17 R, 17 P, 20 R; 203/9, 10, 43, 47; 202/174

[56] References Cited
UNITED STATES PATENTS

| | | | |
|---|---|---|---|
| 1,552,562 | 9/1925 | Kirgan | 159/17 P |
| 2,151,079 | 3/1939 | Bowen | 210/2 |
| 2,739,039 | 3/1956 | Phelps | 159/20 R |
| 2,746,536 | 5/1956 | Sumiya | 159/17 P |
| 2,774,571 | 5/1956 | Mair | 159/47 WL |
| 2,840,154 | 6/1958 | Lankenau | 159/17 R |
| 3,304,991 | 2/1967 | Greenfield | 159/13 A |
| 3,323,575 | 6/1967 | Greenfield | 159/13 A |
| 3,716,458 | 2/1973 | Greenfield et al. | 159/13 R X |
| 3,807,479 | 4/1974 | Brannland et al. | 159/17 P |
| R26,317 | 12/1967 | Greenfield | 159/17 R |
| R26,352 | 2/1968 | Greenfield | 159/13 A |

*Primary Examiner*—Jack Sofer
*Attorney, Agent, or Firm*—Richard L. Cannaday

[57] ABSTRACT

Process and apparatus for recovering clean water and essentially dry solids from dilute aqueous solids. A dilute stream of aqueous solids is concentrated by heat evaporation and the evaporated water is condensed and recovered. The concentrated aqueous solids are mixed with relatively non-volatile fluidizing oil and subjected to dehydration by heat evaporation. The steam formed in the dehydration step is used to supply heat for the concentration step. The solids are separated from the fluidizing oil and recovered in an essentially dry state while the fluidizing oil is recycled. If desired, a light, relatively volatile oil may be mixed with the dilute aqueous solids to prevent scaling and fouling in the concentration evaporator. The instant invention is thus characterized in that at least a portion of the heat energy of the steam formed by evaporation in the dehydration step is recovered as useful heat within the system.

8 Claims, 2 Drawing Figures

Fig-2

PROCESS AND APPARATUS FOR RECOVERING CLEAN WATER AND SOLIDS FROM DILUTE, AQUEOUS, SOLIDS CONTAINING SOLUTIONS OR DISPERSIONS

CROSS-REFERENCE TO RELATED APPLICATION

This application is a continuation-in-part of our copending application Ser. No. 165,070, filed in the United States Patent Office on July 22, 1971.

BACKGROUND OF THE INVENTION

The economic disposal of waste solids and recovery of clean water from dilute aqueous solutions and dispersions thereof is a recognized problem. Also, the need to recover clean water and valuable solid materials from dilute aqueous solutions and dispersions thereof is a common occurrence. Ideally, apparatuses and processes for the recovery of water from dilute aqueous solids should provide ease of disposition of all constituents, avoidance of pollution, economic operation, and hygienic handling, and should, in addition and particularly, yield clean water. Furthermore, in the course of recovering clean water it is desirable to obtain by-products, both solid and liquid, which are either valuable in themselves or can be utilized to further the economics of the process. For purposes of this invention it is to be understood that the term "aqueous solids" as used in the expression "dilute aqueous solids" is employed generically to include suspensions, dispersions, solutions, and mixtures and other forms of fluid association of solids in water.

In our U.S. Pat. No. 3,716,458 are described process and apparatus for recovering clean water from a dilute solution of aqueous waste solids. In the process disclosed therein a dilute stream of aqueous solids is concentrated by heat evaporation and the evaporated water is condensed and recovered. The concentrated solution of aqueous solids is then mixed with oil and subjected to dehydration by heat evaporation. Again the evaporated water is condensed and recovered. However, the heat energy of the steam formed by evaporation in the dehydration step is given up to condensers and not recovered as useful heat.

SUMMARY OF THE INVENTION

The apparatus and process of this invention comprise a systematic arrangement of equipment and a series of steps for treating dilute aqueous solids whereby substantially all the water therein is recovered in a significantly purified or essentially clean state or condition. For purposes of this invention clean water is water obtained by heat evaporation followed by condensation, free of suspended or dissolved solids although possibly containing some steam-distilled components. In addition to clean water, valuable solid materials may also be recovered from dilute aqueous solutions and dispersions thereof. The instant invention is characterized in that at least a portion of the heat energy of the steam formed by heat evaporation is recovered as useful heat within the system, thereby enhancing the economics of the process.

It is therefore an object of this invention to provide a process and an apparatus for the economic recovery of clean water and solids from dilute aqueous solids.

It is another object of this invention to provide a process and an apparatus for the economic recovery of clean water and solids from dilute aqueous solids by heat evaporation whereby at least a portion of the heat energy of the steam formed by heat evaporation is recovered as useful heat within the system.

It is another object of this invention to provide a process and an apparatus for the economic recovery of clean water and solids from dilute aqueous solids as aforesaid without inherent limitation as to feed material.

The foregoing objects are accomplished by the practice of this invention. Broadly, viewed in one of its principal aspects, this invention comprises a process for recovering clean water from dilute aqueous solids according to the following steps:

1. Concentrating said dilute aqueous solids by heat evaporation to yield concentrated aqueous solids and steam;
2. Condensing said steam;
3. Admixing said concentrated aqueous solids with a relatively non-volatile fluidizing oil to obtain a mixture which will remain fluid and pumpable after the removal of the water content therefrom, and
4. Subjecting the resultant oil-containing mixture to dehydration by heat evaporation to yield steam and a substantially anhydrous solids in oil slurry, said steam from said dehydration step being used as a source of heat in said concentration step.

The foregoing process is carried out in an apparatus for recovering clean water and essentially dry solids from dilute aqueous solids, said apparatus comprising a systematic arrangement of items of equipment as follows:

1. A tank adapted to receive a stream of said dilute aqueous solids and provided with a stirring or agitating mechanism for mixing the dilute aqueous solids,
2. A first evaporator,
3. A conduit extending from said tank to said first evaporator wherethrough may flow a stream of dilute aqueous solids from said tank into the evaporating region of said first evaporator,
4. A condenser,
5. A conduit extending from said first evaporator to said condenser through which may flow steam formed as a result of heating of said dilute aqueous solids,
6. A fluidizing tank provided with a stirring or mixing mechanism,
7. A conduit extending from said first evaporator to said fluidizing tank wherethrough may flow a stream of concentrated aqueous solids from said first evaporator to said fluidizing tank,
8. An oil reservoir,
9. A conduit extending from said oil reservoir to said fluidizing tank wherethrough may flow a stream of relatively non-volatile fluidizing oil from said oil reservoir to said fluidizing tank to become mixed with the concentrated aqueous solids therein,
10. A second evaporator,
11. A conduit extending from said fluidizing tank to said second evaporator wherethrough may flow a mixed stream of concentrated aqueous solids and relatively non-volatile fluidizing oil from said fluidizing tank into the evaporating region of said second evaporator, 12. A combustion apparatus associated with said second evaporator for supplying evaporative heat thereto, and 13. A conduit extending from said second evaporator to said first evaporator through which may flow steam formed as a result of heating the mixture of concentrated aqueous solids and fluidizing oil in the second evaporator from said second evaporator to said first evaporator for supplying evaporative heat thereto.

The instant invention thus provides process and apparatus for recovering clean water and essentially dry solids from dilute aqueous solids. Dilute aqueous solids are concentrated by heat evaporation and the evaporated water is condensed and recovered. The concentrated aqueous solids are mixed with a fluidizing oil and subjected to dehydration by heat evaporation. The steam formed in the dehydration step is used to supply heat for the concentration step. The instant invention is thus characterized in that at least a portion of the heat energy of the steam formed by evaporation in the dehydration step is recovered as useful heat within the system.

The nature and substance of the present invention as well as its objects and advantages will be more clearly perceived and fully understood by referring to the following description and claims taken in connection with the accompanying drawings which are described briefly below.

DESCRIPTION OF THE PREFERRED EMBODIMENTS

The water and solids recovery process of this invention as applied to dilute aqueous solids thus comprises the steps of evaporatively concentrating the dilute aqueous waste solids with recovery of the evaporated water; mixing the now concentrated aqueous solids with a relatively non-volatile oil to obtain a mixture which will remain fluid and pumpable even after the removal of essentially its entire water content, and subjecting the resulting mixture of solids, water and oil to a dehydration step by heat evaporation with subsequent recovery of a substantially anhydrous slurry of solids in oil. The steam formed in the dehydration step is used to supply heat for the concentration step. In one embodiment of this invention, a light, relatively volatile oil is mixed with the dilute aqueous solids prior to evaporation. The presence of the light oil prevents scaling and fouling in the concentration evaporator, thereby affording improved heat transfer and reducing corrosion caused by corrosive solids.

The essentially anhydrous slurry of solids in oil may, if desired, be separated to yield the oil and the solids in a largely dry and oil-free condition. This may be accomplished by mechanical pressure of either a static or a dynamic variety, or both, on the anhydrous slurry whereby the greater part of the oil is expressed from the solids. In some cases, as in the processing of sewage or slaughter house wastes, the waste itself contains an appreciable amount of oil independently of oil which may be added to it prior to the dehydration step. This oil will be carried through the dehydration step along with the solids and the added oil and be subjected to being pressed out of the dehydrated slurry along with the added oil. If the dry or essentially water-free slurry be pressed sufficiently vigorously, it may thus be made to yield oil in a quantity or at a rate equal to or in excess of that in or at which oil was previously added to the concentrated aqueous solids. Generally it is desirable that the pressing step yield enough oil for the dehydration step that the process will be selfsufficient with respect to oil requirements. Even more desirably, in some cases the pressing step will generate somewhat more oil than is needed for the dehydration step so that the process will provide a net oil yield.

The dry solids left after the pressing operation may often be utilized for purposes outside the process itself and thus constitute a process product. The process and apparatus of this invention may be used to recover clean water from dilute aqueous solids derived from numerous sources. Thus, for example, this invention finds utility in the recovery of water from a variety of materials which are found in aqueous solution or water dispersion, e.g., powdered coal, cement, spent lime, inorganic salts, sewage, sewage sludge, slaughterhouse effluent and rendering products, slimes, black liquor from the paper industry, cannery or canning factory effluent, food products, animal feeds and wastes, pharmaceutical products and wastes, chemicals, etc. Accordingly, depending on the source, the dry solids recovered from the pressing operation may be used, for example, as fertilizer, as animal feed, or as food products for human consumption. Further, since they are often burnable, they may be used as fuel for the generation of steam needed to run the evaporator components of the apparatus for the concentration step and the dehydration step, and also the steam needed to run auxiliary equipment such as pumps, either directly if they be steam-driven pumps or indirectly if they be motor driven pumps and the steam is used to run a turbogenerator directly. The process may thus be at least partly selfsufficient in respect of fuel requirements. The process and apparatus of this invention thus provide means for the recovery of essentially clean water from dilute aqueous solids and, in addition, allow for the recovery of valuable products and byproducts therefrom.

The material to be treated by the process of this invention should contain solids particles having a maximum size of about one-fourth inch. Larger particles may be ground to size or comminuted by existing techniques.

The oils which are utilized for admixture with the concentrated aqueous solids prior to the dehydration operation are inert, relatively non-volatile oils or fats, or other oil-like materials. Typical of these are tallow, other animal fats and vegetable oils, all of which often can be derived directly from the process operation; petroleum oils and their fractions and derivatives including fuel oils, silicone oils, glycerines, glycols and mixtures thereof, and miscellaneous liquid wastes from industrial plants, being generally of an organic nature. It is desirable to employ an oil that imparts process credits, i.e., one that can add value to the solids product, such as waste oils normally found in sewage or industrial waste, or fuel oils, or, as suggested above, employ oils derived in the practice of the process itself so as to minimize cost factors. The quantity of oil is such that its ratio in the system is in the range of about 2 to about 20 parts or more by weight, based on each part of non-fat or non-oil based solids. This refers to total oil, i.e., that added plus that derived from the process for reuse. This amount of oil gives a fluid, pumpable mixture even in the absence of water. The term "fluid" as used here is intended to be synonomous with "liquid," i.e., taking the shape of the container to the extent that the mixture fills the container. This will also include heavy, viscous fluids which are pumpable but still suitable for heat transfer purposes.

In one embodiment of the instant invention, a light, relatively volatile oil is mixed with the dilute aqueous solids prior to the concentration step. The presence of the light oil during evaporative concentration results in the formation of a coating of the oil on the surfaces of the evaporator, thereby preventing fouling and the build-up of scale deposits at the boiling surfaces of the evaporator such as the interior surfaces of the evaporator tubes. In addition, since the materials which cause fouling and scaling are often corrosive in nature, the presence of the oil film prevents corrosion of the evaporator heat transfer surfaces. Evaporative concentration of mixtures of light, relatively volatile oil and dilute aqueous solids yields water vapor containing at least a portion of the light oil and concentrated aqueous solids containing substantially the remainder of that oil which is carried through the subsequent dehydration step. The light oil in the evaporated water or water vapor may be separated by conventional means.

The light oils which are utilized for admixture with the dilute aqueous solids prior to the concentration operation are low in viscosity and contain appreciable levels of relatively volatile components. Typical of these are light lubricating oils, varsols, kerosene fractions of inedible and edible grades and feed grade derived from petroleum sources that have little or no water solubility, short chain fatty alcohols, distillates from No. 2 up to No. 6 or higher viscosity heavy fuel oils, the Isopar series of isoparaffinic oils manufactured by Humble Oil and Refining Company, steam distillable organic liquids, and combinations or blends of light and heavy oils. In the evaporative concentration step, the mixture of light oil and dilute aqueous solids is brought into contact with the evaporating surfaces of the evaporator where the oil forms a film. The volatile components of the light oil are codistilled with the water and are thus available to wash down and form a film on the outside of the evaporator tubes. The tube surfaces are therefore kept clean and fouling and scaling, as well as corrosion, are prevented.

The quantity of light, relatively volatile oil which is to be added to the dilute aqueous solids prior to concentration is empiric since in cases where severe corrosion or scaling is to be avoided, e.g., in the case of concentrating or drying sulfuric acid wastes, the dilute aqueous solids itself may be just a small fraction by weight of the light oil which is added to it. In general, however, the light oil represents from 1/2 percent to 50 percent by weight of the dilute aqueous solids, and preferably it represents from about 3 percent to about 15 percent by weight of the dilute aqueous solids with which it is mixed. After concentration, any residual oil present in the concentrated aqueous solids will blend with the heavy, relatively non-volatile fluidizing oil added to the system prior to evaporative dehydration.

While the concentration step and the dehydration step of this invention may each be carried out in the single stage or single effect evaporators known in the art, it is preferred that each of these steps be accomplished in a plurality of sequential heat evaporation steps wherein each of the successive evaporation steps is at a successively higher temperature and the resulting waste solids streams are of successively higher concentration because of increasing dehydration, the evolved vapors of each evaporation step supplying a substantial portion of the heat requirements of the preceding heat evaporation step. Thus the plurality of sequential heat evaporation steps connotes at least two. The equipments that can be employed are multiple-effect evaporators known in the art, e.g., Mojonnier, Bufflovak, Rodney-Hunt, recompression type evaporators such as thermal or mechanical recompression types, etc. Functionally, evaporator equipment may be of the forced circulation, flash, falling film recirculation, single pass, rotary wiped film, or indeed any suitable type. The temperatures, pressures and concentrations in each of the successive series of evaporation steps are largely empiric in nature, depending upon the systems and oils being employed.

Normal processing temperatures for the initial concentration of the dilute aqueous solids mixtures may be in the range of about 70°F to about 200°F in the first stage and about 130°F to about 250°F in the second, third or final stages of a multi-effect evaporating system. The preferred processing temperatures are in the range of about 90°F to about 175°F in the first stage and about 150°F to about 220°F in the second, third or last stages. The normal processing temperatures for the dehydration of the relatively non-volatile oil-concentrated aqueous solids mixture may be in the range of about 160°F to about 300°F in the first stage and about 200°F to about 400°F in the second, third or final stages of a multi-effect drying system. The preferred processing temperatures are in the range of about 180°F to about 250°F in the first stage and about 230°F to about 350°F in the second, third or last stages. The foregoing ranges and progressions of temperatures are reasonable in the case where the flows through the evaporator of the mixture being concentrated or dehydrated and the heating or drying steam are substantially countercurrent, the evaporator in this mode of operation being called a "backward flow" evaporator. The temperatures also depend on the desired quality of the end product and economics of fuel utilization, cooling water availability, capital investment, etc.

In the foregoing paragraph the expression "first stage" refers to that part of the evaporator equipment in which the dilute aqueous solids mixture or the relatively non-volatile oil-concentrated aqueous solids mixture is subjected to the first step of a sequential plurality of evaporation steps, two or three or more corresponding to "second stage," "third stage," etc. The expression "effect," on the other hand, as in "multiple-effect" or "multi-effect," is related to the flow and action of the heating medium, customarily steam, in the evaporator equipment. Where the flow of dilute aqueous solids or an oil-concentrated aqueous solids mixture being heated and evaporated is countercurrent to that of the heating steam (backward flow), the first stage of the evaporator is the same as its last effect.

The pressures are not critical and are controlled with temperatures to achieve desired evaporation rates in a given design. Thus the first stage pressure will conveniently be from about ½ inch Hg absolute to approximately atmospheric. The pressures then increase in successive stages responsive to the temperatures in the aforedescribed countercurrent or backward flow case. It is advantageous to operate the first stage at subatmospheric pressures, and the final stages at close to atmospheric.

The advantage of the sequential evaporation steps may be seen from the following. For example, in a double-effect evaporator with feed entering at 80°F, the material can leave the evaporator at 225°F–250°F with ratios of approximately one pound of steam utilized for approximately 1-½ to 1-¾ pounds of water evaporated; whereas in normal single-effect operations about 1-½ pounds of steam could be required to achieve the same result with only one pound of water evaporated. If triple or more effect evaporation be utilized, even further economies in fuel consumption are made possible. It should be noted that the evolved vapors from each of the heat evaporation steps after the first step supply a substantial portion of the heat requirement of the preceding heat evaporation step or stage in the case of a backward flow evaporator. The only net or external heat input required is that needed to raise the temperature of the components to evaporation temperatures and make good for heat losses.

Generally, more water is removed in the concentration step or steps than in the drying or final dehydrating step of operation of an evaporative system handling dilute aqueous solids. Indeed the amount removed during concentration may be several times the amount removed during dehydration or final drying but this is not a necessary operating parameter in the practice of the present invention.

The water from the concentration step may be combined with that from the dehydration step or, alternatively, water from the two steps or operations may be kept separate. The final product from the dehydration step is generally a substantially anhydrous oil-solids slurry containing no more than about 5–10 weight percent water on a non-oil basis. The water content is such as to permit fuel efficiency when the solids which have been separated from the oil are burned or representation of those solids as being in an essentially dry state when they are disposed of as a marketable product. Thus, by operating with and according to the disclosed apparatus and process substantially all the water is recovered from a dilute aqueous solids feed or raw material in an essentially clean state and essentially dry solids are also recovered, typically, anhydrous waste solids from raw sewage.

This invention will be most clearly perceived and best understood through reference to the preferred embodiments as discussed in further detail in connection with the flow diagrams shown in the drawings. While this invention is useful for the recovery of clean water and solids from dilute aqueous solids generally, it is illustrated here in connection with the recovery of clean water and solids from dilute aqueous waste solids. In the embodiment illustrated in FIG. 1, a stream of dilute aqueous waste solids enters mixing tank 4 through line 6. The fluid mixture is blended or agitated in the mixing tank by means of stirring device 8 and then withdrawn from the mixing tank by means of pump 10. Pump 10 delivers the dliute aqueous solids through line 12 which meets recycle line 14 at a "T" joint or connection. The fluid mixture is conducted through line 14 to the first stage or third effect evaporator 16 of an overall concentrating evaporator assembly or array. In evaporator 16 water is boiled off at a subatmospheric pressure which may typically be about 2 inches Hg absolute. The temperature of the partially concentrated product of the entering dilute aqueous waste solids is in the range of about 70°–200°F and preferably about 90°F –175°F, depending on the pressure in the evaporator. The evaporator 16 is heated by steam or vapor from line 18 which is at a temperature about 30°–40°F higher than the temperature of the partially concentrated dilute aqueous solids. Condensate of the heating steam is withdrawn from evaporator 16 through line 20 which meets product water line or conduit 24 at a "T" joint.

Figure 1:
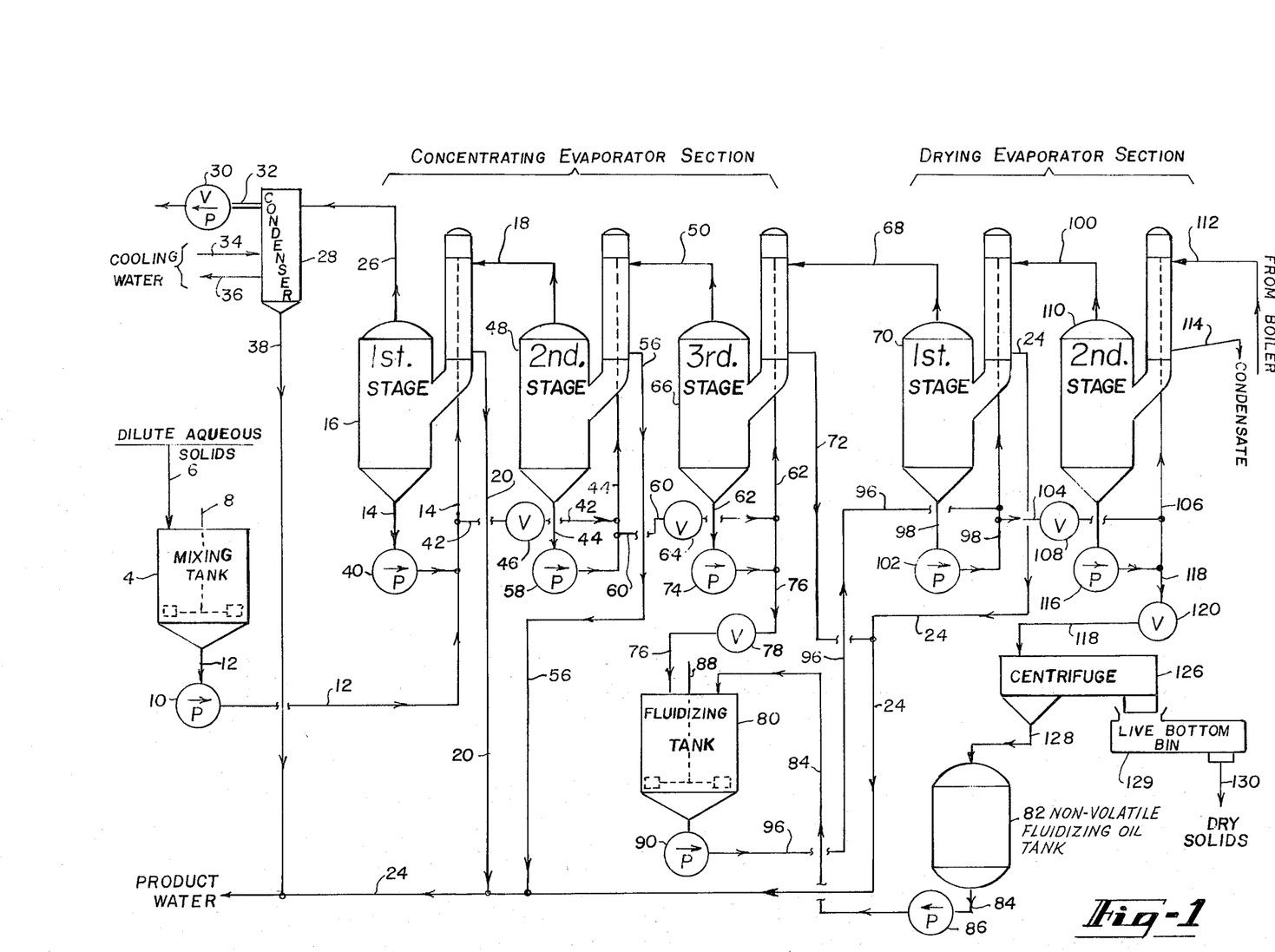
FIG. 1 illustrates the apparatus of the instant invention wherein dilute aqueous solids are concentrated in a first evaporator section; the resultant concentrated aqueous solids are mixed with a relatively non-volatile fluidizing oil, and the mixture of concentrated aqueous solids and oil is subjected to dehydration in a second evaporator section. The apparatus is characterized by having steam formed as a result of dehydration in the second evaporator section used to supply evaporative heat to the first evaporator section.

Water vapor formed as a result of the concentration of the entering dilute aqueous waste solids mixture is removed from the vapor chamber of first stage evaporator 16 through line 26 into surface condenser 28 within which a partial vacuum is maintained by means of vacuum pump 30 which is connected to said condenser by vacuum line 32. Cooling water enters condenser 28 via line 34 and exits therefrom via line 36. Water vapor or steam entering condenser 28 through line 26 is condensed therein, and the resulting water is discharged through line 38 which meets product water line 24 at a "T" joint or connection. Product clean water is drawn off continuously through product water line 24. If desired, part of the product water may be reused within the system. Alternatively, all the recovered water may be stored in a reservoir for later use in applications in which essentially clean water is required.

The partially concentrated aqueous waste solids from evaporator 16 are continuously removed through recycle line 14 with the assistance of pump 40 which is located therein. Line 14 meets line 42 at a "T" joint whereby part of the aqueous solids discharged from evaporator 16 through line 14 is recycled through line 14 back to evaporator 16 and part enters line 42 which meets recycle line 44 at a "T" joint. The relative proportions of the aqueous waste solids which are recycled and which enter line 42 are determined by the setting of valve 46 which is located on line 42. Pump 40 forces at least a portion of the partially concentrated aqueous solids through line 42 and ultimately line 44 to second stage 48 of the concentration evaporator. In the second stage evaporator a procedure is followed which is similar to that in the first stage except that the absolute pressure is generally higher. The absolute pressure in each succeeding evaporator stage is usually somewhat higher than in the preceding stage, approaching approximately atmospheric pressure in the last stage. The temperature of the further concentrated product of the second stage evaporator is in the range of about 130°–250°F and preferably about 150°–220°F, depending on the absolute pressure in the evaporator. The heating medium is steam which is at a temperature about 30°–40°F higher than the temperature of the further concentrated aqueous waste solids leaving the second stage evaporator. The heating steam comes through line 50 from the vapor chamber of the third or succeeding concentrating evaporator stage. Condensate of the heating steam is withdrawn from evaporator 48 through line 56 which meets product water line 24 at a T joint.

The further concentrated aqueous waste solids from evaporator 48 are continuously removed through recycle line 44 with the assistance of pump 58 which is located therein. Line 44 meets line 60 at a T joint whereby part of the aqueous solids discharge from evaporator 48 through line 44 is recycled through line 44 back to evaporator 48 and part enters line 60 which meets recycle line 62 at a T joint. The relative proportions of the aqueous waste solids which are recycled and which enter line 60 are determined by the setting of valve 64 which is located on line 60. Pump 58 forces at least a portion of the further concentrated aqueous waste solids through line 60 and ultimately line 62 to third stage 66 of the concentration evaporator. In the third stage evaporator a procedure is followed which is similar to that in the second stage except that the absolute pressure is generally higher, advantageously being approximately atmospheric.

The temperature of the still further concentrated product of third stage evaporator 66, i.e., aqueous waste solids significantly reduced in water content from their condition entering the concentrating evaporator through line 14, is generally greater than that of the product of second stage evaporator 48 and is within the range of about 130°–250°F, preferably about 150°–220°F, depending on the pressure in the evaporator. The heating medium is steam at a temperature about 30°–50°F higher than that of the still further concentrated aqueous waste solids product. The heating steam comes through line 68 from the vapor chamber of the first stage 70 of a two-stage drying evaporator. Condensate of the heating steam is withdrawn from evaporator 66 through line 72 which meets product water line 24 at a T joint. The still further concentrated aqueous waste solids, now existing as a concentrate in water solution or dispersion, are continuously withdrawn from third stage evaporator 66 through recycle line 62 with the assistance of pump 74 which is located therein. Line 62 meets line 76 at a T joint whereby part of the aqueous solids discharged from evaporator 66 through line 62 is recycled through line 62 back to evaporator 66 and part enters line 76. The relative proportions of the aqueous waste solids which are recycled and which enter line 76 are determined by the setting of valve 78 which is located on line 76. Pump 74 forces at least a portion of the still further concentrated waste solids product, now existing as a concentrate in water solution or dispersion, through line 76 to fluidizing tank 80.

The matter of the degree of concentration of the aqueous waste solids in the stream of material withdrawn from the concentrating evaporator by pump 74 and conducted to fluidizing tank 80 may be considered in at least qualitative terms. This stream of material must be at least sufficiently fluid to be pumpable with essentially all of its fluidity coming from its water content although, depending upon the nature of the original waste material supplied to the illustrated system through line or conduit 6, some oils or fluid fats may be present also and make some contribution to fluidity. As an example of an extreme condition in one direction, assuming that fluidity is due essentially entirely to water content and assuming further that the concerned waste solids are insoluble paper fibre wastes, a solids concentration of no more than about 3 percent to 4 percent by weight could be achieved in the material withdrawn by pump 74. As an example of an opposite extreme, again assuming that fluidity is due essentially entirely to water content, but now with the further assumption of the concerned waste solids being soluble solids of black liquor from a paper mill, a solids concentration up to about 50 percent by weight might well be obtainable. Generally, solids which are soluble in water may be concentrated to a much greater extent than those which are insoluble.

It may be assumed in any case that the non-fat waste solids content in the stream of feed material supplied to the concentrating evaporator through line 14 is very low indeed, probably not more than ½ percent by weight and in many particular instances appreciably less than that. For evaporator design calculation purposes, therefore, the stream of material fed through line 14 may be regarded as essentially entirely water. The number of stages going to make up the overall concentrating evaporator, three or more or less, will depend to a great extent in any specific case on the percentage amount of water to be removed in and by the concentrating evaporator. As suggested hereinbefore, that in turn is a function of the amount of water which must be left in association with the aqueous waste solids to assure pumpability of the slurry in the last stage of that evaporator.

Returning to detailed consideration of FIG. 1, relatively non-volatile fluidizing oil from centrifuge oil tank 82 is delivered through line 84 by pump 86 into fluidizing tank 80 into which is also delivered the concentrated aqueous waste solids product. In fluidizing tank 80 the concentrated aqueous waste solids and the relatively non-volatile oil are mixed by stirring device 88 in a ratio that yields a pumpable fluid mixture or slurry capable of remaining pumpable even after evaporation of its relatively small remaining water content. The slurry of wet waste solids in relatively non-volatile fluidizing oil may contain for each hundred parts of said wet waste solids about two hundred to about two thousand parts of said oil. The slurry of wet waste solids in fluidizing oil is withdrawn from fluidizing tank 80 and discharged by pump 90 through line 96 which meets recycle line 98 at a T joint or connection. Pump 90 delivers the slurry of wet waste solids in fluidizing oil through line 96 and ultimately recycle line 98 into first stage 70 of a two-stage drying evaporator.

In the first stage of the drying evaporator water is boiled off at a subatmospheric pressure which may typically be about 10–30 inches Hg absolute. The temperature of the partially dehydrated product of the entering slurry is in the range of about 160°–300°F and preferably about 180°–250°F, depending upon the pressure in the evaporator. The system is heated by steam from line 100 which is at a temperature about 30°–40°F higher than the temperature of the partially dehydrated product slurry of waste solids in fluidizing oil. Condensate of the heating steam is withdrawn from evaporator 70 through product water line 24. Water vapor formed as a result of the partial dehydration of the entering slurry of wet waste solids in fluidizing oil is removed from the vapor chamber of first stage 70 of the drying evaporator through line 68 and is conducted to third stage 66 of the concentrating evaporator. Thus, in accordance with the practice of this invention, steam formed in the dehydration step is used to supply at least part of the heat for the concentration step.

The partially dehydrated slurry of waste solids in fluidizing oil generated in first stage 70 of the drying evaporator is removed continuously through recycle line 98 with the assistance of pump 102 which is located therein. Line 98 meets line 104 at a T joint whereby part of the slurry discharged from evaporator 70 through line 98 is recycled through line 98 back to evaporator 70 and part enters line 104 which meets recycle line 106 at a T joint. The relative proportions of the partially dehydrated slurry which are recycled to evaporator 70 and which enter line 104 are determined by the setting of valve 108 which is located on line 104. Pump 102 forces at least a portion of the slurry through line 104 and ultimately line 106 to second stage 110 of the drying evaporator. A procedure similar to that in the first stage of the evaporator is followed in the second stage thereof except that the pressure is usually higher, being close to atmospheric. The temperature of the essentially dehydrated waste solids and fluidizing oil mixture produced in second stage 110 of the drying evaporator is in the range of about 200°–400°F and preferably about 230°–350°F, depending upon the absolute pressure in the evaporator. The heating medium is steam which is at a temperature about 30°–50°F higher than the temperature of the essentially anhydrous oil and waste solids slurry product. This steam is generated in a boiler-furnace and conveyed to second stage 110 of the drying evaporator through line 112. Condensate of the heating steam is withdrawn through line 114 and returned to the boiler-furnace, not shown, being of any suitable and convenient design.

The essentially anhydrous slurry of waste solids in fluidizing oil withdrawn from second stage evaporator 110 is discharged by pump 116 through recycle line 106. Line 106 meets line 118 at a T joint whereby part of the slurry discharged from evaporator 110 through line 106 is recycled through line 106 back to evaporator 110 and part of the slurry enters line 118. The relative proportions of the slurry which are recycled to evaporator 110 and which enter line 118 are determined by the setting of valve 120 which is located on line 118. Pump 116 forces at least a portion of the essentially anhydrous slurry through line 118 to continuous centrifuge 126 regarded generally as pressing apparatus. The relatively non-volatile fluidizing oil is separated from the waste solids in centrifuge 126 and is conducted therefrom via line 128 to centrifuge oil tank 82. Recovered fluidizing oil is discharged by pump 86 through line 84 to fluidizing tank 80 for recycling through the system. If the process provides a net yield of fluidizing oil, it may be recovered from centrifuge oil tank 82 and stored for use outside the system.

The waste solids are discharged from continuous centrifuge 126 and enter live bottom bin 129. The live bottom of bin 129 causes the waste solids to advance to the exit thereof where said waste solids, in an essentially anhydrous state, are discharged through line 130. Consistent with techniques illustrated and described in our aforementioned U.S. Pat. No. 3,716,458, line 130 may extend to a grinder in which the dry and substantially deoiled or defatted solids initially in cake or chunk form are reduced to granular if not powder form. For purposes of delivering the solids to the grinder, line 130 may take the particular form of a conveyor belt or screw conveyor. From the grinder the comminuted solids may flow to the suction side of a blower which finally discharged them into the furnace region of the boiler-furnace to be burned there as fuel for the generation of steam to operate the evaporators. Of course the boiler-furnace may be supplied with fuel other than or in addition to the dry solids, and some or all of the solids produced by the illustrated system or apparatus removed from the system entirely for uses or disposal altogether outside of it.

Figure 2:
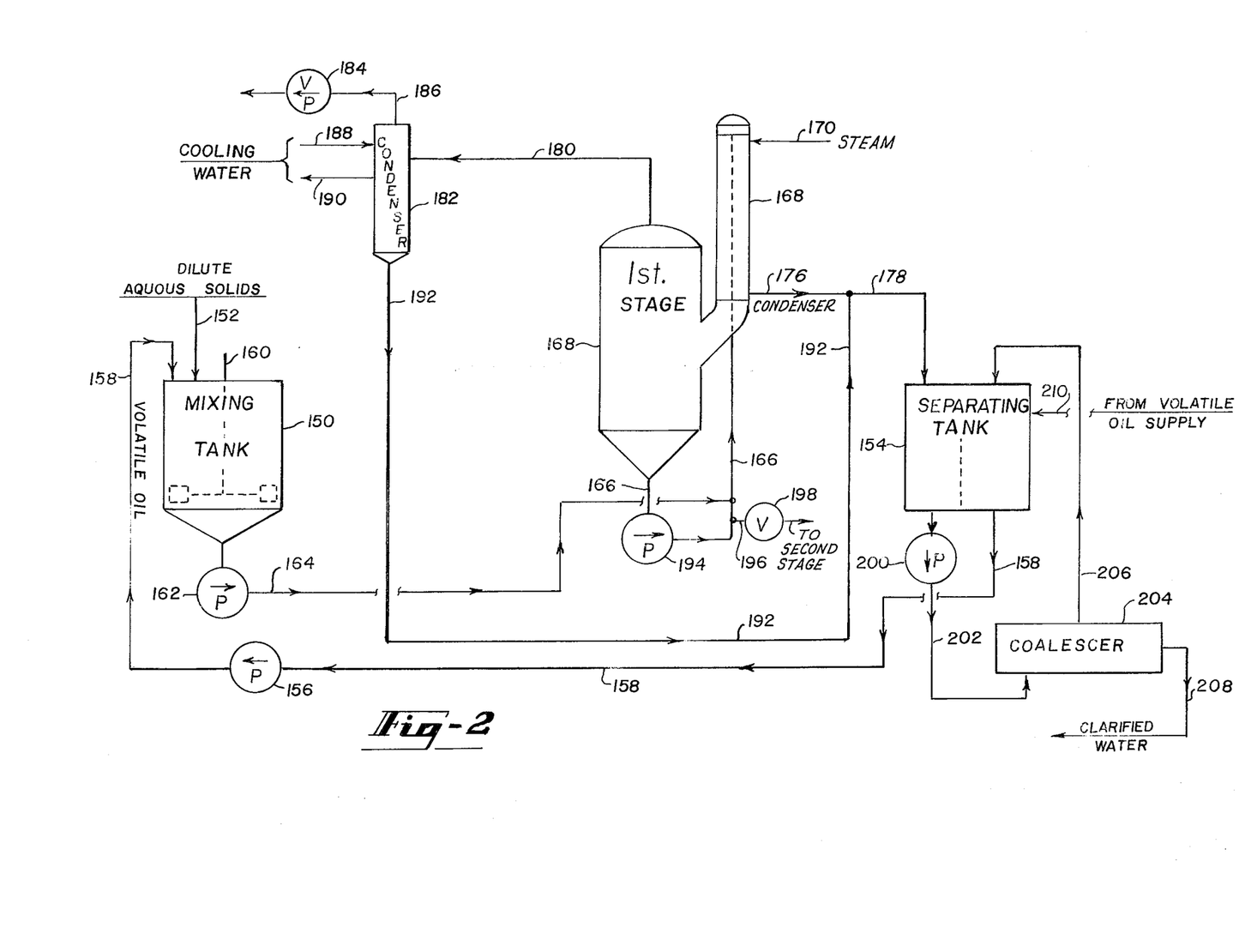
FIG. 2 illustrates a portion of the apparatus of FIG. 1 depicting the embodiment wherein a light, relatively volatile oil is mixed with the dilute aqueous solids prior to the concentration step.

FIG. 2 depicts a portion of the apparatus used in a modification of the apparatus of FIG. 1 wherein a light, relatively volatile oil is mixed with the dilute aqueous waste solids prior to the concentration step. The presence of the light oil during evaporative concentration results in a coating of the oil on the surfaces of the evaporator, thereby preventing fouling of the evaporator such as the interior surfaces of the evaporator tubes.

Referring now to the flow diagram of FIG. 2, a stream of dilute aqueous waste solids flows into mixing tank 150 through line 152. Oil, assumed to be a light, relatively volatile oil, from separating tank 154 is forced by pump 156 through line 158 to mixing tank 150. The dilute aqueous waste solids and the light oil are mixed in tank 150 by means of an agitating device 160 and the resultant mixture is continuously withdrawn from the tank by pump 162 and discharged through line 164 which meets recycle line 166 at a T joint or connection. The fluid mixture is conducted through line 166 to the first stage 168 of a multi-stage concentrating evaporator assembly or array. In evaporator 168 water and part of the relatively volatile oil are boiled off at a subatmospheric pressure which may typically be about 2 inches Hg absolute. The temperature of the partially concentrated mixture of relatively volatile oil and aqueous waste solids is in the range of about 70°–200°F and preferably about 90°–175°F, depending on the pressure in the evaporator. The evaporator 168 is heated by mixed vapors of water and volatile oil from the vapor chamber of the next higher stage of the concentrating evaporator which are conducted thereto via line 170 and which are at a temperature about 30°–40°F higher than the temperature of the partially concentrated mixture of volatile oil and aqueous waste solids. Condensates of the heating vapors are withdrawn from evaporator 168 through line 176 which meets product water/volatile oil outlet line 178 at a T joint.

Water vapor and relatively volatile oil vapor formed as a result of the concentration of the mixture of dilute aqueous waste solids and volatile oil are removed from the vapor chamber of first stage evaporator 168 through line 180 into surface condenser 182 within which a partial vacuum is maintained by means of vacuum pump 184 which is connected to said condenser by vacuum line 186. Cooling water from a suitable source enters condenser 182 via line 188 and exits therefrom through line 190. The condensate of water and volatile oil is withdrawn from condenser 182 through line 192 which meets product water/volatile oil outlet line 178 at a T joint.

The partially concentrated mixture of aqueous waste solids and volatile oil is continuously removed through recycle line 166 with the assistance of pump 194 which is located therein. Line 166 meets line 196 at a T joint whereby part of the mixture discharged from evaporator 168 thorough line 166 is recycled through line 166 back to evaporator 168 and part enters line 196 through which it is ultimately conducted to the second stage of the concentrating evaporator. The relative proportions of the mixture which are recycled and which enter line 196 are determined by the setting of valve 198 which is located on line 196.

In the second and subsequent stages of the concentrating evaporator the procedures followed are similar to that in the first stage except that the pressures and temperatures are generally higher. Such sequential evaporative concentration operations have been remarked upon above in connection with the description of FIG. 1. In each of the stages of the concentration evaporator water and part of the relatively volatile oil are boiled off until a concentrated aqueous waste solids product, which may contain some higher boiling fractions of the volatile oil, is obtained. The concentrated aqueous waste solids, and any residual oil that may be present therein, is mixed with a relatively non-volatile fluidizing oil and the mixture subjected to dehydration essentially as described above with regard to the discussion of FIG. 1.

The mixture of product water and volatile oil from the concentration step is conducted through line 178 to separating tank 154. The water phase, containing some volatile oil, is delivered by pump 200 through line 202 to coalescer 204. In the coalescer essentially complete separation of the remainder of the volatile oil from the product water occurs. Volatile oil from coalescer 204 is returned through line 206 to separating tank 154 from which it may be withdrawn through line 158 and added to the dilute aqueous waste solids in mixing tank 150. Clean product water, essentially completely free from volatile oil, is withdrawn from coalescer 204 through line 208. If the process provides a net yield of relatively volatile oil, it may be recovered from separating tank 154 and stored for use outside the system. On the other hand, if makeup volatile oil be needed it may be supplied to separating tank 154 from an outside source via line 210. While in the foregoing description of the employment of the apparatus embodiment of the present invention shown in FIG. 2 utilization of a relatively volatile oil has been described, it will be understood that a heavy oil with little if any volatile material could be used in its stead, although that would not be preferred.

CONCLUSION

While the flow diagrams as shown in the drawings have been discussed above in connection with the concentration and subsequent dehydration of dilute aqueous waste solids, it will be understood by those skilled in the art that our invention is not limited thereto. Hence, the instant invention finds utility in the concentration and subsequent dehydration of dilute aqueous solids generally and may be used to advantage in the case of aqueous solids having intrinsic value. Examples of such solids are pharmaceutical products, animal feeds, and food products for human consumption.

Thus, the instant invention provides process and apparatus for recovering clean water and essentially dry solids from dilute aqueous solids. A dilute stream of aqueous solids is concentrated by heat evaporation and the evaporated water is condensed and recovered. In one embodiment of the invention a light, relatively volatile oil is mixed with the dilute aqueous solids to prevent scaling and fouling in the concentration evaporator. In either case, the resultant concentrated aqueous solids are mixed with a relatively non-volatile fluidizing oil and subjected to dehydration by heat evaporation. The steam formed in the dehydration step is used to supply heat for the concentration step. The solids are separated from the fluidizing oil and recovered in an essentially dry state while the fluidizing oil is recycled. The instant invention is thus characterized in that at least a portion of the heat energy of the steam formed by evaporation in the dehydration step is recovered as useful heat within the system.

While specific embodiments of the present invention have been shown and described in detail to illustrate the utilization of the inventive principles, it is to be understood that such showing and description have been offered only by way of example and not by way of limitation. It should be understood in particular that one or more additional concentrated streams may be discharged from other sources of compatible raw material into fluidizing tank 80 and dried. Protection by Letters Patent of this invention in all its aspects as the same are set forth in the appended claims is sought to the broadest extent that the prior art allows.

We claim as our invention:

1. A process for recovering clean water from dilute aqueous solids by evaporation while avoiding corrosion and scaling and fouling in the evaporating apparatus, said process comprising the steps of (1) adding a light, relatively volatile oil to said dilute aqueous solids; (2) concentrating said oil and aqueous solids mixture by heat in an evaporator wherein said mixture comes in contact with the evaporating surface thereof to yield (i) water vapor and any distillable components of said oil and (ii) concentrated aqueous solids containing the remainder of said oil; (3) condensing said water vapor and distilled oil components; (4) separating liquid water resulting from said condensing step from the distilled and recondensed oil components in the liquid mixture thereof; (5) admixing said concentrated aqueous solids containing said residual relatively volatile oil with relatively non-volatile fluidizing oil to obtain a mixture which will remain fluid and pumpable after the removal of the water content therefrom; (6) subjecting the resultant oil-containing mixture to dehydration by heat evaporation to yield steam and a substantially anhydrous solids in oil slurry, and (7) using said steam from dehydration step (6) as a source of heat in concentration step (2).

2. The process of claim 1 wherein concentration step (2) is carried out at temperatures in the range of from about 70°F to about 250°F and dehydration step (6) is carried out at temperatures in the range of from about 160°F to about 400°F.

3. The process of claim 2 which further comprises the step of separating said anhydrous solids in oil slurry to give a dry and substantially oil-free solids product and an oil.

4. The process of claim 3 which further comprises the step of utilizing at least part of the oil resulting from the separation of said anhydrous solids in oil slurry as at least part of the fluidizing oil admixed in step (5) with said concentrated aqueous solids containing residual oil from step (2).

5. An apparatus for recovering clean water and essentially dry solids from dilute aqueous solids, said apparatus comprising (1) a tank adapted to receive a stream of said dilute aqueous solids and provided with a stirring or agitating mechanism for mixing the dilute aqueous solids, (2) a first evaporator, (3) a conduit extending from said tank to said first evaporator wherethrough may flow a stream of dilute aqueous solids from said tank into the evaporating region of said first evaporator, (4) a condenser, (5) a conduit extending from said first evaporator to said condenser through which may flow steam formed as a result of heating of said dilute aqueous solids, (6) a fluidizing tank provided with a stirring or mixing mechanism, (7) a conduit extending from said first evaporator to said fluidizing tank wherethrough may flow a stream of concentrated aqueous solids from said first evaporator to said fluidizing tank, (8) an oil reservoir, (9) a conduit extending from said oil reservoir to said fluidizing tank wherethrough may flow a stream of relatively non-volatile fluidizing oil from said oil reservoir to said fluidizing tank to become mixed with the concentrated aqueous solids therein, (10) a second evaporator, (11) a conduit extending from said fluidizing tank to said second evaporator wherethrough may flow a mixed stream of concentrated aqueous solids and relatively non-volatile fluidizing oil from said fluidizing tank into the evaporating region of said second evaporator, (12) means for supplying evaporative heat to said second evaporator, and (13) a conduit extending from said second evaporator to said first evaporator through which may flow steam formed as a result of heating the mixture of concentrated aqueous solids and fluidizing oil in the second evaporator from said second evaporator to said first evaporator for supplying evaporative heat thereto.

6. The apparatus of claim 5 wherein said first evaporator and said second evaporator are both multi-stage evaporators and each is adapted to have fluid material to be heated and evaporated in it and vaporous material to effect that heating and evaporating flow through it countercurrently.

7. The apparatus of claim 5 which further comprises a pressing apparatus adapted to effect a separation of said mixture of concentrated aqueous solids and oil into its components of substantially oil-free solids and an oil following dehydration of said mixture in said second evaporator, and a conduit extending from said second evaporator to said pressing apparatus through which a dehydrated mixture of solids and oil may flow from said second evaporator to said pressing apparatus.

8. The apparatus of claim 7 which further comprises a conduit extending from said pressing apparatus of said oil reservoir through which oil separated from said dehydrated mixture of solids and oil may flow from said pressing apparatus to said oil reservoir.

* * * * *

UNITED STATES PATENT AND TRADEMARK OFFICE
CERTIFICATE OF CORRECTION

PATENT NO. : 3,898,134

DATED : August 5, 1975

INVENTOR(S) : Charles Greenfield et al.

It is certified that error appears in the above—identified patent and that said Letters Patent is hereby corrected as shown below:

On the title page, [56] References Cited "2,774,571" should read --2,744,571--.
designating the reference patent to Mair.

column 11, line 50, for "generally" read --generically--.

column 16, line 24 (Claim 8, line 2), for "of" read --to--.

Signed and Sealed this

Twenty-second Day of February 1983

[SEAL]

Attest:

GERALD J. MOSSINGHOFF

Attesting Officer

Commissioner of Patents and Trademarks